United States Patent
Huffman et al.

(10) Patent No.: US 7,124,248 B2
(45) Date of Patent: Oct. 17, 2006

(54) CURRENT MEDIA STATUS DETERMINATION FOR A STORAGE DEVICE

(75) Inventors: Amber Huffman, Banks, OR (US); Knut S. Grimsrud, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 346 days.

(21) Appl. No.: 10/689,011

(22) Filed: Oct. 20, 2003

(65) Prior Publication Data
US 2005/0086397 A1    Apr. 21, 2005

(51) Int. Cl.
*G06F 12/00* (2006.01)
*G06F 3/00* (2006.01)

(52) U.S. Cl. .................. 711/115; 710/15; 711/113; 711/156

(58) Field of Classification Search ............. None
See application file for complete search history.

(56) References Cited

U.S. PATENT DOCUMENTS

2003/0236953 A1*  12/2003  Grieff et al. ............... 711/151
2005/0080842 A1*   4/2005  Takeuchi et al. .......... 709/200

OTHER PUBLICATIONS

Microsoft, Computer dictionary, 1997, Microsoft Press, Third Edition, pp. 33, and 142.*
Draft, "Information technology—SCSI-3 Architecture Model", X3T10, 994D, Revision 18, Nov. 27, 1995.

* cited by examiner

*Primary Examiner*—Reginald Bragdon
*Assistant Examiner*—Mehdi Namazi
(74) *Attorney, Agent, or Firm*—Buckley, Maschoff & Talwalkar LLC

(57) ABSTRACT

According to some embodiments, a current media status is determined for a storage device.

11 Claims, 7 Drawing Sheets

302 — RECEIVE AT A HOST SYSTEM AN ASYNCHRONOUS MESSAGE FROM A STORAGE DEVICE AS A RESULT OF A CURRENT MEDIA STATUS CHANGE, WHEREIN THE MESSAGE CAN ALSO BE RECEIVED FOR A REASON OTHER THAN A CURRENT MEDIA STATUS CHANGE

304 — ARRANGE FOR A POWER STATE ASSOCIATED WITH THE STORAGE DEVICE TO BE ADJUSTED AS A RESULT OF THE MESSAGE

FIG. 3

CURRENT MEDIA STATUS DETERMINATION FOR A STORAGE DEVICE

BACKGROUND

A storage device may store and/or retrieve information via removable media. For example, a Compact Disc (CD) drive reads information from a CD that can be inserted into or removed from the drive. The storage device may also transmit information to a host system (e.g., by transmitting information to a motherboard via a serial interface). In some cases, the host system may need to determine whether or not the removable media is currently present in the storage device (e.g., to perform a certain action when a CD is inserted into a CD drive). For example, the host system may command the storage device to transition from a lower-power state to a higher-power state when removable media is inserted. As another example, an Operating System (OS) or application executing at the host system might perform a task when removable media is inserted (e.g., by automatically asking a user whether or not information on the media should be played).

BRIEF DESCRIPTION OF THE DRAWINGS

FIG. 3 is a flow chart of a host system method according to some embodiments.

DETAILED DESCRIPTION

A storage device may store and/or retrieve information via removable media. For example, a CD drive reads information from a CD and a Digital Versatile Disc (DVD) drive reads information from a DVD. In some cases, a CD drive or a DVD drive can also store information onto a CD or a DVD. Similarly, a hard disk drive and a tape drive store and/or retrieve information via a removable hard disk and a magnetic tape, respectively.

Figure 1:
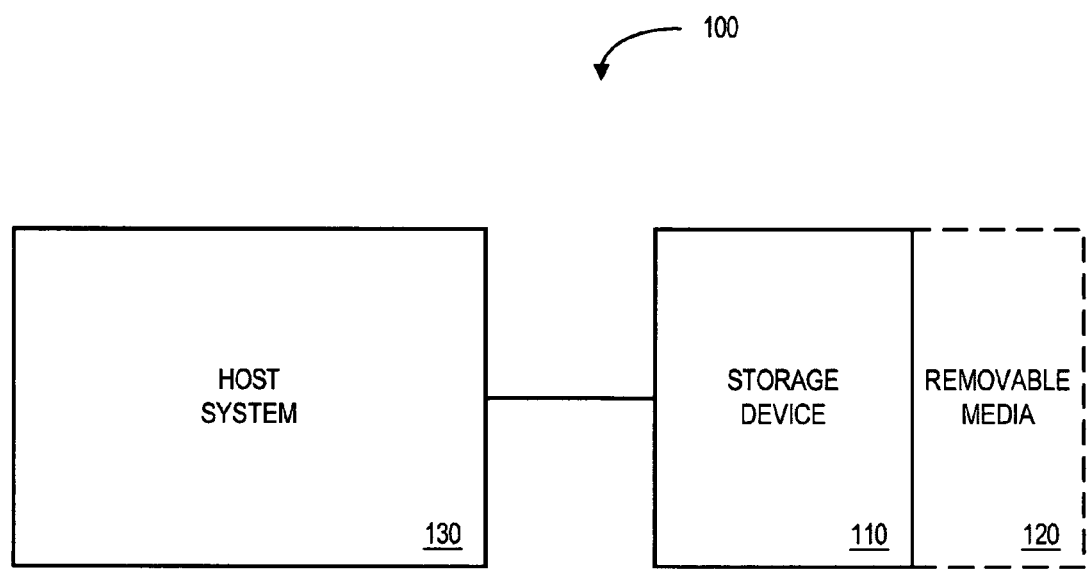
FIG. 1 is a block diagram of a storage device and a host system.

FIG. 1 is a block diagram of a system 100 that includes a storage device 110 and a host system 130. Note that the storage device 110 and host system 130 might be separate devices or may be components of a single device, such as a Personal Computer (PC).

The storage device 110 may receive "removable" media (e.g., media that is adapted to be inserted and/or removed by a user). The removable media 120 may be, for example, a CD, a DVD, a removable hard disk, or a magnetic tape that can be inserted into or removed from the storage device 110 by a user. The host system 130 may be associated with, for example, a PC, a mobile computer, a server, a workstation, or a hand-held device.

The storage device 110 may exchange information between the host system 130 and the removable media 120. For example, the storage device 110 may read information from the removable media 120 and provide the information to the host system 130. In some cases, the storage device 110 may receive information from the host system 130 and store the information onto the removable media 120.

The storage device 110 and the host system may exchange information, for example, via a serial interface such as a Serial Advanced Technology Attachment (ATA) interface as defined by the Serial ATA Working Group specification entitled "Serial ATA: High Speed Serialized AT Attachment" (January 2003).

In some cases, the host system 130 may need to determine whether or not the removable media 120 is currently present in the storage device 110 (e.g., to perform a certain action when a CD is inserted into a CD drive). For example, the host system 130 may command the storage device 110 to transition from a lower-power state to a higher-power state when removable media 120 is inserted.

To determine whether or not the removable media 120 is currently present in (or at) the storage device 110, the host system 130 could synchronously poll the storage device 110. Such an approach, however, might prevent the storage device 110 and/or host system 130 (e.g., a processor or chipset associated with the host system 130) from entering a lower-power state. For example, the storage device 110 might need to remain in a "standby" state as opposed to a lower-power "sleep" state in order to respond to the polling. Similarly, the polling might require Direct Memory Access (DMA) bus activity at the host system 130—preventing a processor at the host system 130 from entering a lower-power C3 or C4 power state as described in the Advanced Configuration and Power Interface (ACPI) Specification Revision 2.0b (October, 2002). As a result, the system 100 might consume a significant amount of power in order to determine whether or not the removable media 120 is present (e.g., reducing the battery life of a mobile computer system).

Figure 2:
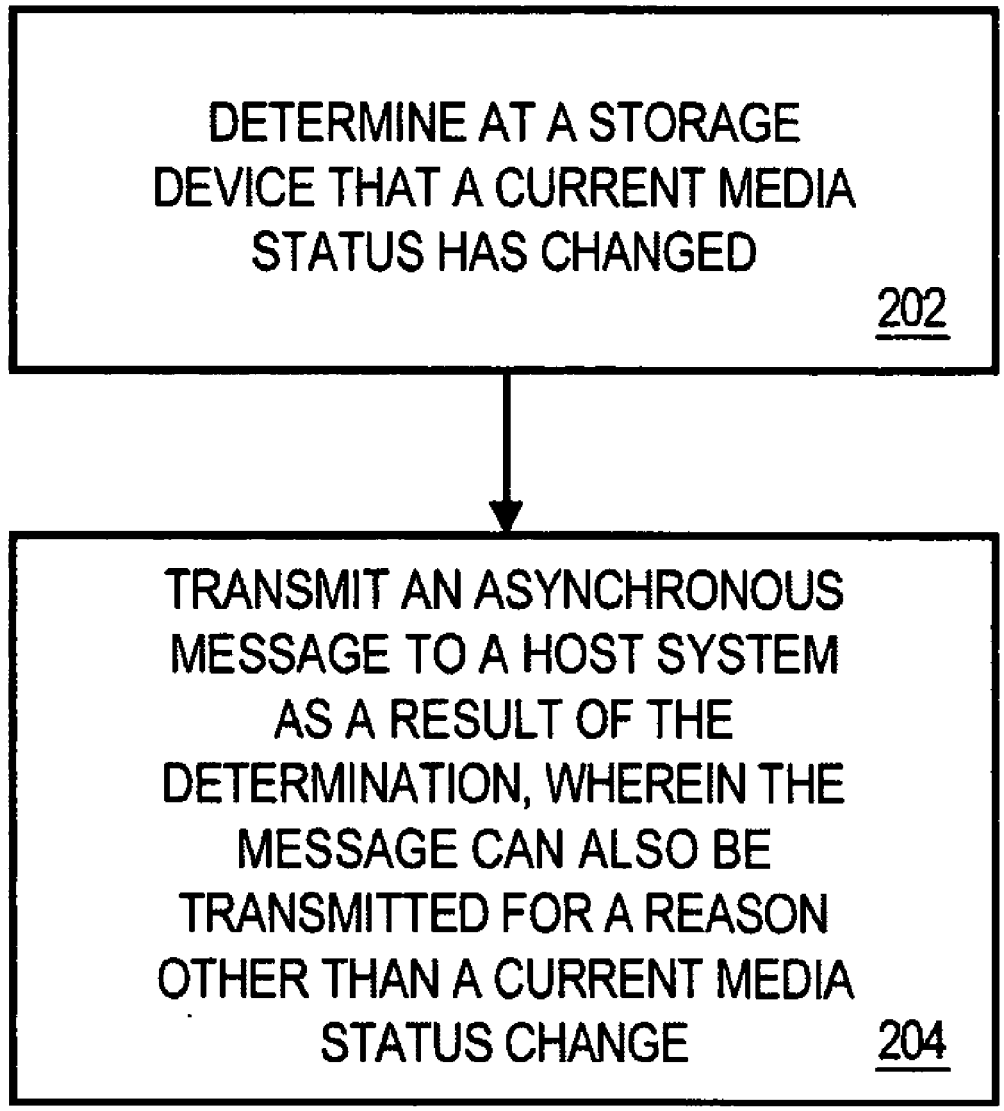
FIG. 2 is a flow chart of a storage device method according to some embodiments.

FIG. 2 is a flow chart of a storage device method according to some embodiments. The method may be performed, for example, by the storage device 110 of FIG. 1. The flow charts described herein do not necessarily imply a fixed order to the actions, and embodiments may be performed in any order that is practicable. Note that any of the methods described herein may be performed by hardware, software (including microcode), or a combination of hardware and software. For example, a storage medium may store thereon instructions that when executed by a machine result in performance according to any of the embodiments described herein.

At 202, it is determined at a storage device that a current media status has changed. For example, it might be determined that tape cartridge has been inserted into or removed from the storage device.

At 204, an asynchronous message is transmitted to a host system as a result of the determination. Moreover, the asynchronous message is a message that could also be transmitted for a reason other than a current media status change.

By way of example, the message could be a Serial ATA "Set Device Bits" packet that might also be used to provide error or status information to the host system. In this case, an bit in the Set Device Bits packet might be used as a notification bit (e.g., with 0 indicating that the packet was sent for a reason other than a change in the current media status and a 1 indicating that that the packet was sent because of a change in the current media status). Because an existing type of asynchronous message is used, any changes required (e.g., firmware and software changes) to support any of the embodiments described herein may be limited.

In addition, the storage device may be able to perform the determination and transmit the asynchronous message even when in a reduced power state. For example, a storage device might be able to perform the determination and transmit a Set Device Bits packet to a host system even when in sleep state or a lower-power state as defined by the "Advanced Configuration and Power Interface (ACPI) Specification Revision 2.0b" (October 2002).

FIG. 3 is a flow chart of a host system method according to some embodiments. The method may be performed, for example, by the host system 130 of FIG. 1. At 302, the host system receives from a storage device an asynchronous message as a result of a current media status change, the asynchronous message being of a type that could also be received for a reason other than a current media status change. Moreover, as described with respect to FIG. 5, according to some embodiments the host system may arrange for a power state associated with the storage device to be adjusted as a result of the asynchronous message at 304 (e.g., by commanding or transitioning the storage device to a higher-power state when media is inserted).

As a result, it may be determined whether or not removable media is currently present in a storage device without needing to synchronously poll the storage device. Moreover, it might be possible for the storage device to be in a lower-power state when no media is present (e.g., because the storage device does not need to respond to polling). Similarly, the host system might be able to determine the current media status while in a lower-power state (e.g., because it does not need to poll the storage device).

Figure 4:
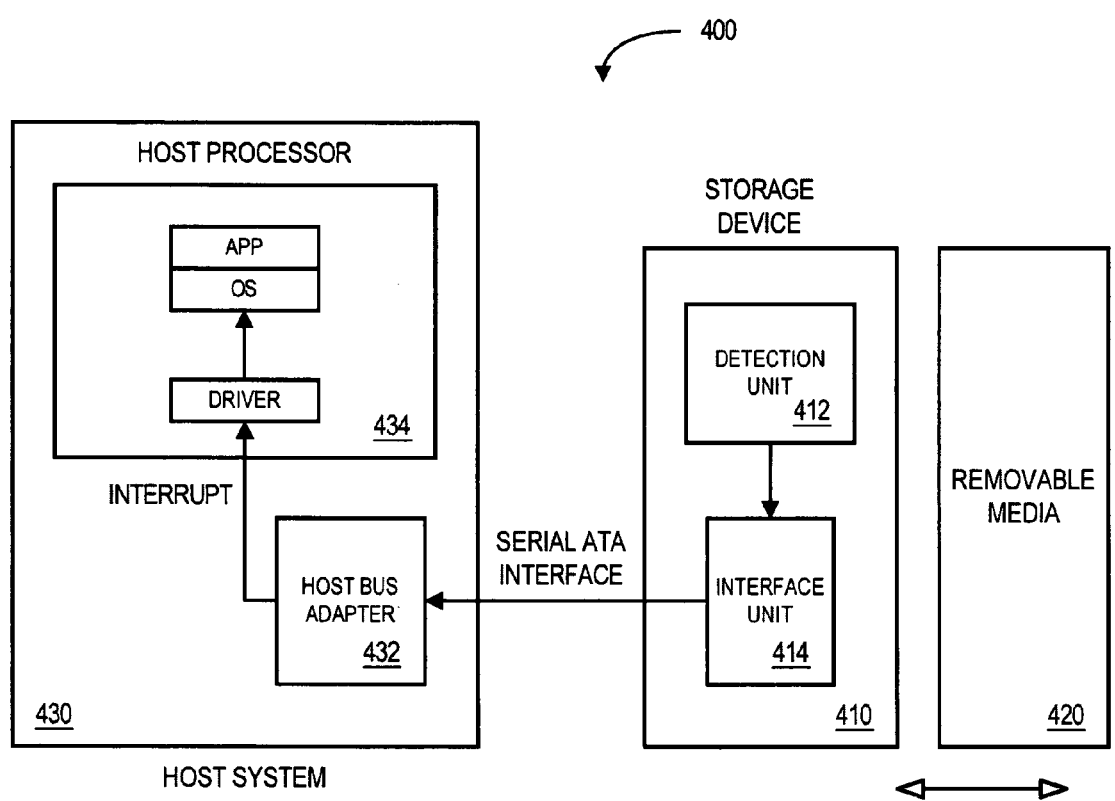
FIG. 4 is an example including a serial ATA interface according to some embodiments.

FIG. 4 is an example of a system 400 that includes a serial ATA interface according to some embodiments. The system 400 also includes a storage device 410 (e.g., a DVD drive)—and removable media 420 (e.g., a DVD) may be inserted into or removed from the storage device 410 by a user. In addition, a host system 430 (e.g., a PC or mobile computer) may include a host processor 434, such as an INTEL® PENTIUM® 4 processor. The host processor 434 may, for example, execute an OS, one or more low level device drivers, and/or one or more application programs.

According to this embodiment, the storage device 410 includes a detection unit (e.g., a hardware and/or software unit) to determine whether or not the removable media is currently present (or simply to determine if there is a change in the current removable media status). The storage device 410 may further include an interface unit 414 to transmit an asynchronous message to the host system 430 when there is a change in the current media status (e.g., when a DVD has been inserted into or removed from the storage device 410). The asynchronous message may be, for example, a serial ATA Set Device Bits packet. Note that the serial ATA protocol allows for the storage device 410 to initiate the sending of a Set Device Bits packet to the host processor 430 (e.g., even when there is no outstanding command). According to some embodiments, the detection unit 412 and the interface unit 414 can perform these functions even when the storage device 410 is in a lower-power sleep state.

The host system 430 receives the asynchronous message at a host bus adapter 432. The host bus adapter 432 may be, for example, located on a motherboard, integrated into a chipset, or a Peripheral Component Interconnect (PCI) device connected through a bus as defined in the PCI Standards Industry Group (SIG) standard entitled "Conventional PCI 2.2" or "PCI Express 1.0."

According to some embodiments, the host bus adapter 432 updates information in a register when the Set Device Bits packet is received from the storage device 410. Moreover, the packet may result in an interrupt being generated to a device driver (e.g., a storage device driver) that is executing at the host processor 434. Because the storage device driver might receive interrupts for other reasons (e.g., when the Set Device Bits packet is sent for another reason), the storage device driver may examine information in the appropriate register whenever an interrupt is received to determine if a change in the current media status was the cause of a particular interrupt (e.g., by inspecting a dedicated notification bit in the Set Device Bits packet).

Note that the asynchronous message received from the storage device 410 might only indicate that the current media status has changed. That is, the message might not indicate whether the change was an insertion (or removal) of the media 420. Thus, the storage device driver may transmit a query to the storage device 410 and the storage device 410 may respond by indicating the current media status (e.g., that the removable media 420 is currently present or absent). This information may then be provided to the OS, and the OS might, for example, ask a user whether or not content on the removable media 420 should be played at that time.

Figure 5:
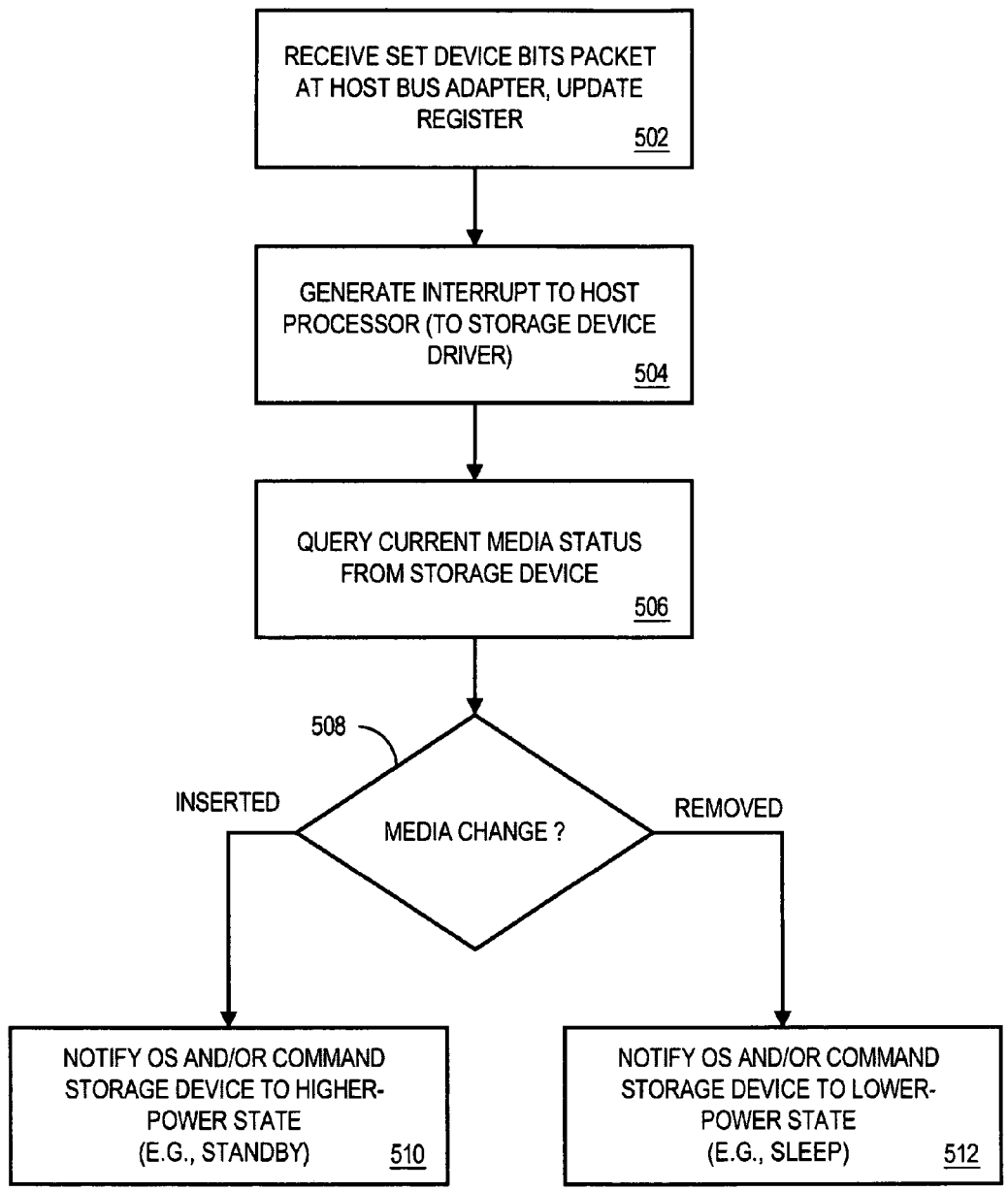
FIG. 5 is a flow chart of a serial ATA interface method according to some embodiments.

FIG. 5 is a flow chart of a serial ATA interface method according to some embodiments. The method may be performed, for example, by the host system 430 of FIG. 4. At 502, a Set Device Bits packet is received by a host bus adapter which in turn updates a register (e.g., an SNotification register). The host bus adapter may also generate an interrupt to a host processor at 504. A storage device driver executing at the host processor may then process the interrupt, such as by executing an Interrupt Service Routine (ISR).

If the storage device driver determines that a change in current media status was the cause of the interrupt (e.g., based on one or more bits in the register), the storage device driver transmits a query to the storage device at 506 asking for the current media status. For example, the storage device driver might transmit a "Get Event Status Notification" query to the storage device.

At 508, a response from the storage device indicates whether the current media status change was because media has been (i) inserted into or (ii) removed from the storage device.

Note that a storage device might be associated with a number of different power states. For example, in a higher-power state the system might provide power via 3.3 Volt (V), 5 V, and 12 V paths or rails. In this case, the storage device could perform all of its normal functions (e.g., including opening a disk drawer and spinning a CD). On the other hand, in a lower-power state the system might provide power only via the 3.3 V path. In this case, the storage device may only perform a limited set of functions (e.g., it might be able to detect a current media status change and transmit a Set Device Bits packet to a host system but be unable to open a disk drawer or spin a CD).

If it is determined that removable media has been inserted into the storage device at 508, the OS may be notified (as described with respect to FIG. 6) and/or the storage device may be commanded to a higher-power state (e.g., standby) at 510. For example, the host system might transmit a command to the storage device instructing it to enter the higher-power state. In some cases, the host system might directly adjust the amount of power that is supplied to the storage device, such as via Field-Effect Transistors (FETs) in a mobile platform.

If it is determined that removable media has been removed from the storage device at 508, the OS may be notified (as described with respect to FIG. 6) and/or the storage device may be commanded to a lower-power state (e.g., sleep) at 512. For example, power might be restored via the 5 V and 12 V paths when removable media is inserted into the storage device. In this way, the host system may determine whether or not removable media is currently present at a storage device and also reduce the amount of power that is used by the host system and/or storage device (e.g., to extend the battery life of a mobile computer).

Although a particular power scheme is illustrated in FIG. 5, embodiments may be associated with other types of power schemes. For example, a storage device might automatically enter a higher-power state (e.g., "wake up") when removable media is inserted. In this case, the storage device may simply notify the host system that the removable media has been inserted (e.g., and the host system would not need to arrange for the storage device to transition to the higher-power state).

Figure 6:
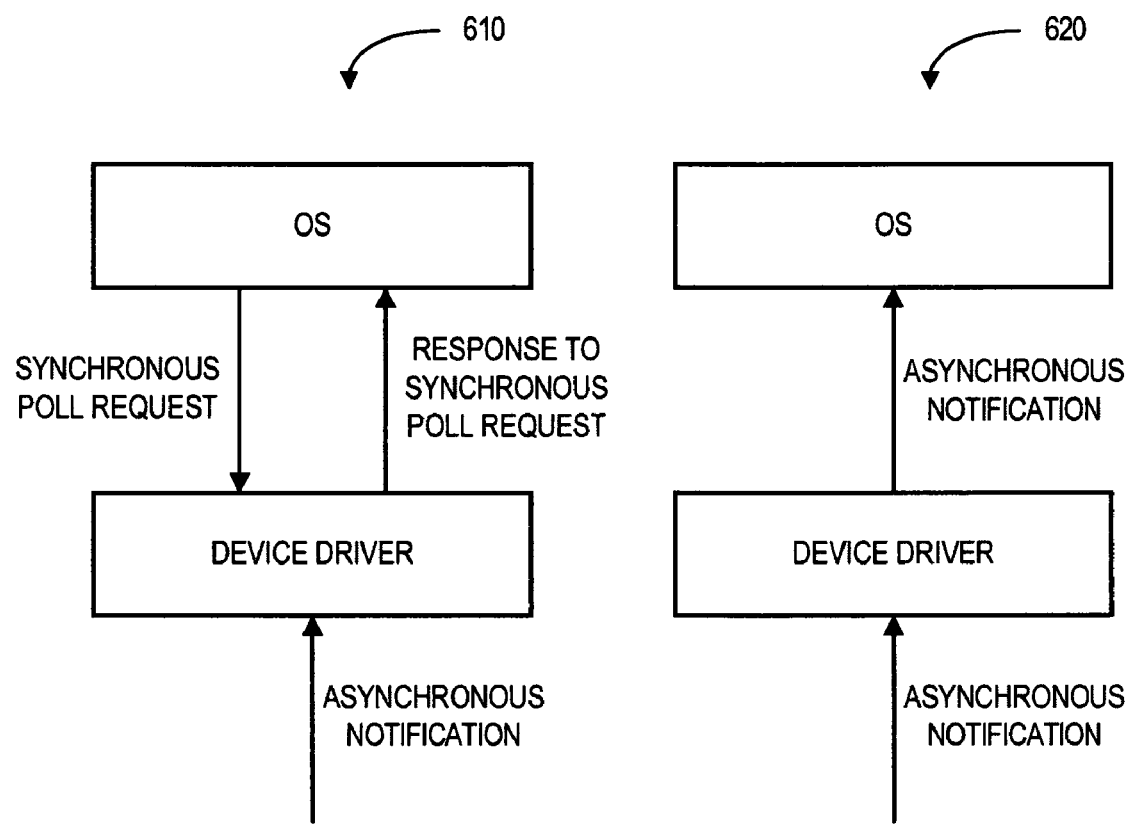
FIG. 6 illustrates information flows for a device driver according to some embodiments.

FIG. 6 illustrates information flows 610, 620 for a device driver according to some embodiments. In a first approach 610, the OS synchronously requests the current media status from the device driver (e.g., in the normal fashion). The device driver receives asynchronous notifications from a storage device and tracks the current media status (e.g., by caching a flag that indicates whether or not the removable media is currently present). The device driver can then use this intercepted information to respond to the synchronous poll request as appropriate. Note that is this case, an existing OS might not need to be modified. In a second approach 620, the device driver receives an asynchronous notification from the storage device and simply passes the notification on to the OS. Note that with the second approach 620, an existing OS might need to be modified to support the receipt of an asynchronous notification from the device driver.

Figure 7:
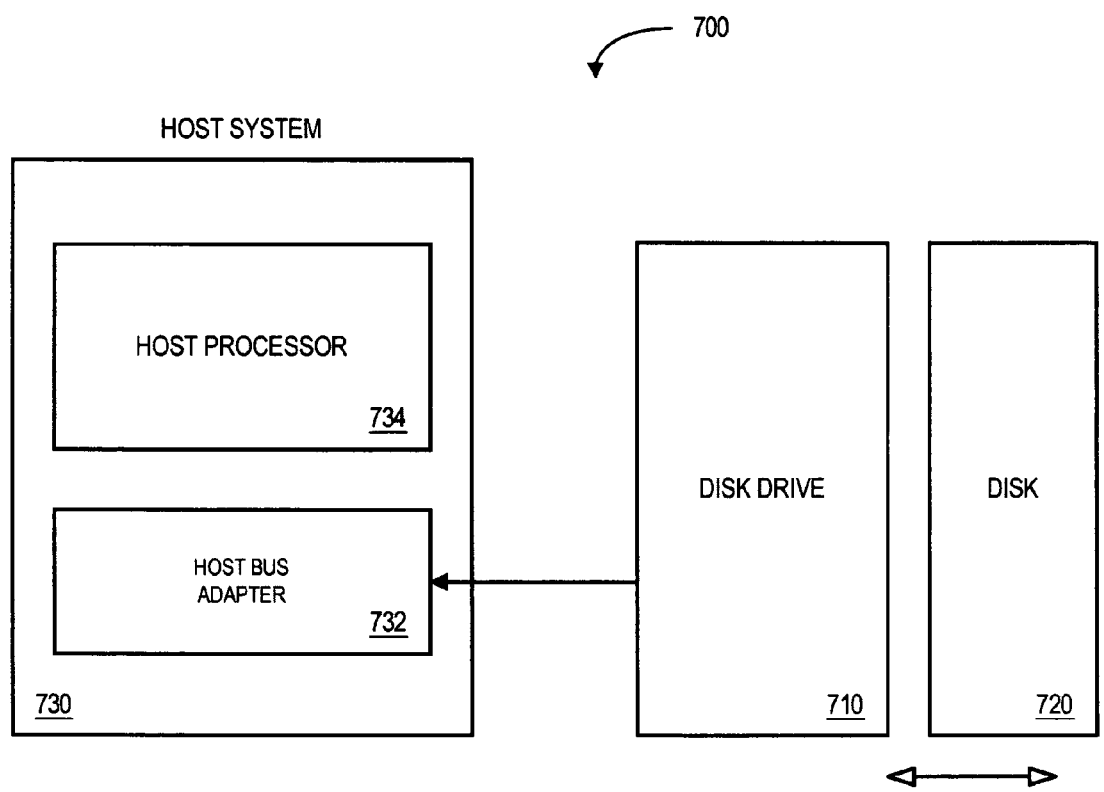
FIG. 7 is a block diagram of a system according to some embodiments.

FIG. 7 is a block diagram of a system 700 that includes host system 730 and disk drive 710 (e.g., a CD, DVD, or removable hard disk drive) into which a disk 720 may be inserted (or from which the disk 720 may be removed) by a user. The disk drive 710 and/or the host system 730 may operate in accordance with any of the embodiments described herein.

For example, a host bus adapter 732 at the host system 730 may receive from the disk drive 710 an asynchronous message indicating that a current disk status has changed, the asynchronous message being of a type that could also be received for a reason other than a change in the current disk status. Moreover, the host bus adapter 732 and/or a host processor 734 may adjust the disk drive's power state as a result of the message.

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

Although particular types of removable media have been described, embodiments may be associated with other types of removable media (e.g., a removable memory card). Moreover, although embodiments have been described with respect to a single storage device, embodiments may be associated with multiple storage devices (e.g., a host processor may manage power states for both a CD drive and a DVD drive).

Similarly, although the asynchronous notification has been described with respect to a change in the current media status, according to other embodiments the asynchronous notification may be used to provide other information. For example, a storage device might transmit an asynchronous notification to a host system indicating that the storage device is overheating (e.g., so that the host system can take appropriate action). As another example, a storage device may be in a lower-power state when a user actives an eject button. In this case, the storage device may notify a host system when the eject button is activated so that the host system can arrange for the storage device to transition to a higher-power state (e.g., allowing the storage device to slide open a tray that accepts a CD).

The several embodiments described herein are solely for the purpose of illustration. Persons skilled in the art will recognize from this description other embodiments may be practiced with modifications and alterations limited only by the claims.

What is claimed is:

1. A method associated with a storage device driver, comprising:
   receiving at the storage device driver an asynchronous notification indicating that a current media status associated with a storage device has changed;
   determining a current media status in response to the received indication;
   caching the current media status;
   receiving a synchronous poll request from an operating system; and
   responding to the synchronous poll request in accordance with the cached current media status.

2. The method of claim 1, further comprising:
   determining at the storage device that the current media status has changed; and
   transmitting the asynchronous notification to a host system as a result of the determination, the notification being of a first type of asynchronous message that can also be transmitted for a reason other than a current media status change.

3. The method of claim 2, wherein the asynchronous notification is associated with a serial advanced technology attachment interface.

4. The method of claim 3, wherein the asynchronous notification is associated with a set device bits packet.

5. The method of claim 1, wherein said receiving is performed after the storage device is in a lower-power state.

6. The method of claim 5, wherein the reduced lower power state is a sleep state.

7. The method of claim 6, further comprising:
   transmitting to the storage device a command to adjust a power state associated with the storage device.

8. The method of claim 1, wherein the current media status indicates at least one of: (i) an absence of a removable storage media, and (ii) a presence of a removable storage media.

9. The method of claim 1, wherein the storage device comprises at least one of: (i) a compact disc drive, (ii) a digital versatile disk drive, (iii) a tape drive, and (iv) a removable hard disk drive.

10. A system, comprising:
    a disk drive to provide an asynchronous notification that a current media status has changed; and
    a host processor having a disk drive driver to (i) determine a current disk status in response to the asynchronous notification, (ii) cache the current disk status, (iii) receive a synchronous poll request from an operating system, and (iv) respond to the synchronous poll request in accordance with the current disk status.

11. A storage device drive apparatus, comprising:
a storage medium having stored thereon instructions that when executed by a machine result in the following:
receiving at a storage device driver an asynchronous notification indicating that a current media status associated with a storage device has changed,
determining a current media status in response to the received indication,
caching the current media status,
receiving a synchronous poll request from an operating system, and
responding to the synchronous poll request in accordance with the cached current media status.

* * * * *